L. ATWOOD.
TUBULAR STRUCTURE AND PROCESS OF MAKING THE SAME.
APPLICATION FILED JAN. 7, 1907.
1,015,120.
Patented Jan. 16, 1912.
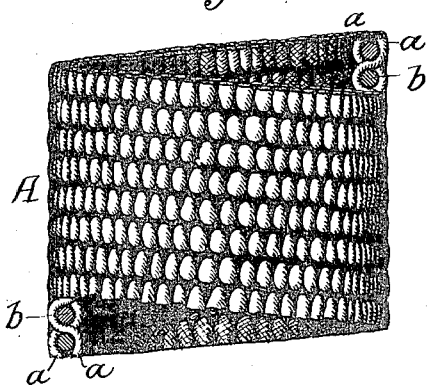
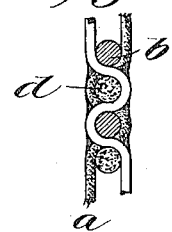
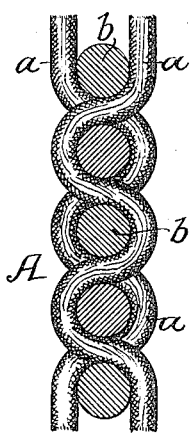
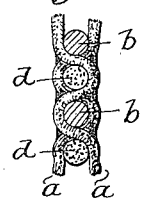
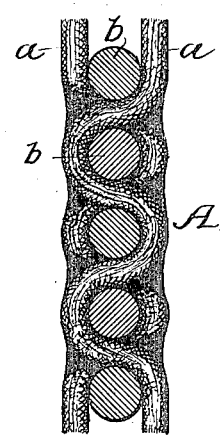

UNITED STATES PATENT OFFICE.

LEONARD ATWOOD, OF PHILADELPHIA, PENNSYLVANIA, ASSIGNOR, BY DIRECT AND MESNE ASSIGNMENTS, TO TUBULAR CONSTRUCTION COMPANY, A CORPORATION OF NEW JERSEY.

TUBULAR STRUCTURE AND PROCESS OF MAKING THE SAME.

1,015,120.      Specification of Letters Patent.      Patented Jan. 16, 1912.

Application filed January 7, 1907. Serial No. 351,126.

*To all whom it may concern:*

Be it known that I, LEONARD ATWOOD, a citizen of the United States, residing in Philadelphia, Pennsylvania, have invented certain Improvements in Tubular Structures and Processes of Making the Same, of which the following is a specification.

My invention relates to tubular structures, and the object of my invention is to make a strong and substantial structure capable of resisting to a maximum degree external and internal pressures.

My invention consists of an improved tubular structure particularly adapted for use as a hose or conduit for the conveyance of water, air, or steam; including the process of making such tubular structure.

In the accompanying drawings: Figure 1, is a side view of a section of tubing embodying my invention; Fig. 2, is an enlarged sectional view of a portion of the tubing before the same has been impregnated with material designed to render the tubular structure impervious; Fig. 3, is a similar sectional view showing a portion of the tubing impregnated with the impervious material, and Figs. 4 and 5, are views illustrating modifications of my invention.

Heretofore in the manufacture of fabric hose or tubing for use with water, air, or steam, it has been the common practice to employ woven cotton fabric, or as it is called "duck," which is dried and then passed through a calendering machine; "friction rubber" being applied to the surface of the fabric by the action of the calender rolls. After having received the friction rubber, the fabric is cut into strips at a suitable angle with respect to the threads of the same and wrapped so as to form a tubular structure. Another method is to make a tube of rubber forming a core, which core is placed upon a mandrel. The mandrel covered by the tubular core is then placed in a hose making machine and strips of woven cotton fabric, as duck, are laid on the outside of the tube and wound around it; the thickness and strength being obtained by the number of layers. A cover or outside is then laid on, after which wet cloth and narrow bandages are applied before vulcanizing.

By the above processes, the rubber (termed friction) is simply pressed upon the surface of the fabric forming the various layers which compose the hose or tube. The inside rubber tube is not integral with the fabric forming the outside rubber tube and becomes loose when attacked by oils or chemicals; thus impairing the strength and use of the tube. When used for steam, tubing manufactured by this process becomes over-vulcanized which makes it brittle, thereby weakening the hose and rendering it liable to fracture. In air brake hose, the inner rubber tube being exposed to the action of oil from the air pump becomes soft and strips off, leaving the hose weak, and the particles of dislodged rubber tend to clog the working parts of the mechanism with which it is employed.

By my invention, I overcome the objections noted above with respect to the ordinary hose or tubing now on the market.

Referring to the drawings, the tube A is made, in the present instance, by weaving a tubular fabric having fiber warps $a$ and metallic wefts $b$, which wefts are preferably made of strong wire and are woven into the fabric in spiral form, as clearly illustrated in the drawing. In this instance, there are two wire wefts making the spiral of a greater pitch than if one spiral weft were used. Consequently, the wefts woven into the fabric in this manner form, in fact, a spiral spring which not only materially strengthens the tube but, being made of spring wire, it will allow the tube to yield and return the same to its normal condition. In some instances untempered wire may be used if desired without departing from one of the essential features of my invention. The wefts of wire may alternate in some instances, as shown in Fig. 4, with wefts of cotton or woolen fiber, as indicated at $d$, and as illustrated in my Patent No. 910,891, dated January 26, 1909.

After the tube has been woven as described, the fabric structure of the same is impregnated with any suitable liquid which will, when set, be impervious to moisture and which will bind the fibers of the fabric and at the same time coat the metallic wefts, preventing oxidation. I apply the liquid to the hose under pressure sufficient to cause the mixture to find its way through the walls of the tube; thus the strands composing the tube are cemented together so that when set the tube will be impervious to moisture, air, or steam. When the hose or tubing is to be employed especially as a steam hose, I use linen threads for the warps and spring steel for the wefts, and the material I employ to render the tube impervious is a compound of linseed oil, white lead and litharge. This compound is applied preferably by closing one end of the tube, inserting the compound within the tube, and then applying sufficient pressure to force the compound through the interstices of the fabric forming the tube; the tube elongating to a certain extent, thereby enlarging the interstices so that the liquid mixture is free to impregnate the several fibers composing the strands of the warp and to completely cover the metallic wefts. When the hose is relieved of pressure, the wall of the same assumes its original condition, and the filling material binds the fibers together so as to form a unitary, pliable structure which will resist steam under the ordinary pressures to which hose for such purposes is subjected. If the hose is to be used as a water conduit, then a solution of rubber may be used which will impregnate the material and form a binder between the several fibers and also form a coating on the metallic portions of the tubing. The hose can be coated with shellac, or paint, or japanned if desired.

For air hose, a compound may be used consisting of rubber, white lead and zinc sulfid, cut with naphtha or equivalent solvent. The tubing in which rubber forms the base can be vulcanized if desired. In some instances a rubber lining may be placed in the tube in addition to impregnating the fiber with the impervious compound, but I find that it is not necessary in ordinary cases.

While I have described my invention as particularly adapted to a continuous woven tube in which wire is combined with fibrous strands, it will be understood that my invention may be employed with fibers both in the warp and weft in addition to the wire, and also with tubes in which the wires may extend both longitudinally and transversely or helically, as shown in Fig. 5.

I claim:—

1. A tubular structure of interwoven fibrous and metallic strands, in combination with means designed to render the structure impervious comprising a sealing compound forced into the fibrous strands of the structure, penetrating, impregnating and combining the same together, and coating said metallic strands.

2. A tubular structure consisting of interwoven fibrous warps and spirally disposed metallic wefts, in combination with means designed to render the structure impervious comprising a sealing compound forced into the strands of the fibrous warps, penetrating, impregnating and uniting the same together, and coating said metallic wefts.

3. A tubular structure consisting of interwoven fibrous warps and metallic wefts, in combination with means designed to render the structure impervious comprising a sealing compound having rubber as a base forced into and between the strands of the fibrous warps, penetrating, impregnating and uniting the same together, and coating said metallic wefts.

4. As a new article of manufacture, a yielding impervious tubular structure having a base of interwoven fibrous and metallic strands combined with a sealing compound penetrating, impregnating and uniting the fibrous portions of said structure and coating the metallic strands of the same.

5. As a new article of manufacture, a yielding impervious tubular structure having a base of interwoven fibrous and metallic strands combined with a sealing compound penetrating, impregnating and uniting the fibrous portions of said structure and coating the metallic strands, said compound comprising a mixture of rubber, white lead and zinc sulfid.

6. The process herein described of making impervious tubular bodies, said process consisting in making a hollow body of interwoven fibrous and metallic strands, introducing a water-proofing compound into the inner space formed by the wall of said tubular body, then forcing the compound through said wall so as to penetrate and impregnate the fibers of the structure, and allowing the portion retained by the fabric to set.

7. The process herein described of making an air-tight and water-proof tubular structure, said process consisting in fabricating said structure from fibrous warps and metallic wefts, introducing into the space formed by the cylindrical wall of said structure a compound which when set will render the structure impervious to water and air and which will coat the metallic portions of the fabric to prevent corrosion, the compound being of such a nature as to allow the structure to yield when dry, then forcing said compound through the wall of the structure to penetrate and impregnate the fibers and coat the metallic portions, and allowing the portion retained by the fibers to set.

In testimony whereof, I have signed my name to this specification, in the presence of two subscribing witnesses.

LEONARD ATWOOD.

Witnesses:
Jos. H. KLEIN,
WM. A. BARR.